US009212945B2

(12) United States Patent
Edwards et al.

(10) Patent No.: US 9,212,945 B2
(45) Date of Patent: Dec. 15, 2015

(54) PORTABLE LUGGAGE SCALE WITH WEIRHT INDICATING DIAL (75) Inventors: Barnaby Bevan Edwards, London (GB); Steven Richard Spong, London (GB)

(73) Assignee: DG International Holdings Limited, London (GB)

( * ) Notice: Subject to any disclaimer, the term of this patent is extended or adjusted under 35 U.S.C. 154(b) by 243 days.

(21) Appl. No.: 13/994,979

(22) PCT Filed: Dec. 22, 2011

(86) PCT No.: PCT/GB2011/001764
§ 371 (c)(1),
(2), (4) Date: Aug. 13, 2013

(87) PCT Pub. No.: WO2012/085512
PCT Pub. Date: Jun. 28, 2012

(65) Prior Publication Data
US 2013/0313028 A1  Nov. 28, 2013

(30) Foreign Application Priority Data
Dec. 22, 2010  (GB) .................................. 1021907.9

(51) Int. Cl.
| G01G 19/14 | (2006.01) |
| G01G 19/58 | (2006.01) |
| G01G 21/28 | (2006.01) |
| G01G 17/00 | (2006.01) |
| G01G 23/20 | (2006.01) |

(52) U.S. Cl.
CPC ................ *G01G 21/28* (2013.01); *G01G 17/00* (2013.01); *G01G 19/14* (2013.01); *G01G 19/58* (2013.01); *G01G 23/20* (2013.01)

(58) Field of Classification Search
CPC ....... G01G 19/14; G01G 19/58; G01G 23/20; G01G 17/00; Y10S 116/32
USPC ................................... 177/148, 149
See application file for complete search history.

(56) References Cited

U.S. PATENT DOCUMENTS

| 3,161,244 | A | * | 12/1964 | Hanssen ........................ 177/173 |
| 3,169,594 | A | * | 2/1965 | Myers ............................ 177/173 |
| 3,759,338 | A | * | 9/1973 | Petersen et al. ............... 177/173 |
| 4,030,559 | A | * | 6/1977 | Fish et al. ...................... 177/159 |
| 6,429,391 | B1 | | 8/2002 | Gruver |
| 6,608,261 | B2 | * | 8/2003 | Thadani ........................ 177/126 |
| 7,232,961 | B1 | | 6/2007 | Godshaw et al. |

(Continued)

FOREIGN PATENT DOCUMENTS

| CN | 2185427 Y | 12/1994 |
| CN | 101243913 A | 8/2008 |
| CN | 201290406 Y | 8/2009 |
| CN | 201337068 Y | 11/2009 |
| CN | 201575855 U | 9/2010 |
| CN | 201624240 U | 11/2010 |
| DE | 20 2009 007 628 U1 | 12/2009 |

(Continued)

*Primary Examiner* — Randy W Gibson
(74) *Attorney, Agent, or Firm* — Dickstein Shapiro LLP (57) ABSTRACT A portable luggage scale (20) comprising a lifting handle (22) or grip, a luggage support (24), a housing (28), a spring based weighing mechanism (26) within the housing (28), a weight indicating dial (30), the weight indicating dial (30) being adapted for movement relative to the housing (28) in response to spring reactions of the spring based weighing mechanism (26), and a measured weight indicating marker (36) for indicating a measured weight, that weight being readable off the dial (30) at the location of the marker (36). The lifting handle (22) can be telescopic, and the luggage support (24) can be a loop (42) of webbing.

20 Claims, 7 Drawing Sheets

(56) References Cited

U.S. PATENT DOCUMENTS

| | | | |
|---|---|---|---|
| D575,178 S * | 8/2008 | Thybulle | D10/89 |
| D575,179 S * | 8/2008 | Thybulle | D10/89 |
| 7,645,949 B1 * | 1/2010 | Thompson | 177/126 |
| 8,853,565 B2 * | 10/2014 | Kritzler | 177/126 |
| 2002/0195282 A1 | 12/2002 | Thadani | |
| 2006/0054364 A1 | 3/2006 | Kamakau | |

FOREIGN PATENT DOCUMENTS

| | | |
|---|---|---|
| GB | 2 408 810 A | 6/2005 |
| GB | 2 411 966 A | 9/2005 |
| GB | 2 443 844 A | 5/2008 |
| GB | 2 448 507 A | 10/2008 |
| WO | WO 2008/125871 A1 | 10/2008 |
| WO | WO 2010/054372 | 5/2010 |

* cited by examiner

PORTABLE LUGGAGE SCALE WITH WEIRHT INDICATING DIAL

The present invention relates to a portable luggage scale.

Portable luggage scales exist. See, for example, the scale disclosed in U.S. Pat. No. 7,232,961. That scale comprises a lifting handle at its top, a luggage supporting hook at its bottom, a spring based weighing mechanism within a housing therebetween and a weight indicating dial at the front of that housing. Further, a tape measuring system is provided within the housing.

The dial comprises a round face and clock-like hands for indicating a weight of the item of luggage being weighed. Those hands comprise two movable hands—a first hand driven by the extension of the spring based weighing mechanism (under a spring-resisted loading from the item of luggage) and the other being driven by the movement of the first hand, that second hand thus providing a maximum weight indication, thereby facilitating a reading of the measured weight without needing to simultaneously carry the weight of the item of luggage—the weight of the item of luggage can be lifted and then returned to the ground, with the second hand retaining a weight measurement on the dial.

A problem associated with this form of luggage scale, however, is that the size of the visible face of the dial is necessarily large relative to the size of the housing since otherwise the clock-like hands would fail to be readable for the full range of measurable. weights.

A second problem associated with this form of luggage scale is that the handle at the top of the scale is cumbersome.

A third problem associated with this form of luggage scale is that the luggage support—in the form of a hook—is also cumbersome.

The present invention seeks to provide an alternative portable luggage scale.

According to the present invention there is provided a portable luggage scale comprising a lifting handle or grip, a luggage support, a housing, a spring based weighing mechanism within the housing, a weight indicating dial, the weight indicating dial being adapted for movement relative to the housing in response to spring reactions of the spring based weighing mechanism, and a measured weight indicating marker for indicating a measured weight, that weight being readable off the dial at the location of the marker.

Preferably the weight indicating marker is in a fixed position relative to the housing, at least during movement of the weight indicating dial. It may even be a permanently fixed marker relative to the housing.

The present invention, by use of a moveable dial, disposes of the use of two clock-like hands, as found in the prior art. Instead it requires the weight indicating dial to be the element that moves relative to the housing, and relative to the fixed measured weight indicating marker, for indicating the measured weight of luggage.

Preferably the weight indicating dial is mounted behind a window of the housing. Preferably that window is glazed—with clear plastic, or glass, glazing.

Preferably the window is a generally arcuate window, with top and bottom arcuate boundaries. The end or side boundaries may be straight or curved. This shape is preferred to either a segment shape or a round shape.

Preferably the weight indicating dial moves by rotating about a fixed axis relative to the housing. Preferably that axis is concentric with either or both of the arcuate boundaries.

In an alternative configuration, the window may be generally rectangular.

The weight indicating dial slides or rotates relative to the window. The measured weight indicating marker is located at or over the window to provide a weight indicating point at a viewable part of the dial—i.e. a part of the dial that is viewable through the window.

Preferably only a portion of the weight indicating dial can be seen at any given time through the window. Preferably that portion is no more than 50% of a circumferential extent of the dial, and more preferably about 30% of a circumferential extent (part-segment) of the dial.

Preferably the weight indicating dial is graduated with weight indications.

Preferably the measured weight indicating marker is a pointer. Alternatively it might be a line extending across the visible portion of the dial, such as across the window.

Preferably the weight indicating dial is a round dial, forming a complete circle or disk, with weight indications provided around at least a substantial extent of that circle or disk. That extent is preferably more than 50% of that circle, and most preferably at least 90% of that circle.

Preferably the weight indicating dial is a disk with the weight indicating marks or graduations being on a front surface of that disk.

In an alternative arrangement, the marks may be on the edge of the disk, e.g. for viewing from, or through a window in, a side of the housing.

Preferably a tape measuring system is incorporated into the housing. Preferably that tape measuring system is incorporated into a lower part of the housing, closer to the luggage support end of the housing than the lifting handle end of the housing.

Preferably the lower part of the housing is a portion of the housing beyond that which contains the dial, i.e. preferably the tape measuring system, such as a coiled tape, is located wholly in an area of the housing that lies outside the outer circumference or perimeter of the weight indicating dial.

Preferably the weight indicating dial is associated with a dial retention mechanism for resisting movement of that weight indicating dial in a return-to-zero direction. As such, the weight indicating dial will rotate to provide an indication of weight as the scale is lifted to bear the weight of the item of luggage, and that rotation freezes at the maximum rotation even as the item of luggage is returned to the ground. The reading of the weight can thus still be taken after the item of luggage is returned to the ground by reading the indicated weight off the dial at the location of the measured weight indicating marker. Then, for releasing the dial to allow it to return to the zero position, the dial retention mechanism can be released. For that purpose, a retention release mechanism is provided, preferably operated by a press of a button. With this arrangement, to weigh a suitcase, the user attaches the luggage support strap to an item of luggage, such as to a handle of a suitcase. The user then lifts the item of luggage using the portable luggage scale, e.g. using the lifting handle. The user then returns the item of luggage to the floor and reads the indicated weight off the dial at the measured weight indicating marker. Finally the user presses the grip release mechanism to allow the dial to return to its zero position.

Preferably the portable luggage scale also features a zeroing dial for allowing the dial to be rezeroed as necessary, e.g. if the dial slips relative to its mounting. The zeroing dial is preferably operated via a threaded member, for adjusting the relative positions of the weight indicating dial and an inter-engaging mechanism of the spring based weighing mechanism. Such zeroing mechanisms are known in the art of scales.

Preferably the zeroing mechanism is disengaged from the weighing mechanism, and the dial, unless the retention release mechanism is activated, such as by the pressing of its button. As such, zeroing can only occur while the dial retention mechanism is disengaged.

According to a second aspect of the present invention, which aspect may be combined with the first aspect, there is provided a portable luggage scale comprising a lifting handle, a luggage support, a weighing mechanism contained within a housing, and a weight indicating screen or dial for indicating weight measured with the weighing mechanism, wherein the luggage support takes the form of a strap having a free end for attachment to an item of luggage, and a second end extending away from the first end, and through a slot in the housing, the second end extending into the housing, through the slot, and being attached to the weighing mechanism within the housing.

Preferably the strap forms a loop at its first end for allowing the strap to be attached to a handle of the item of luggage with a looped hitch, rather than needing a knot to be tied in the strap. The present invention therefore additionally provides, as a further aspect, an item of luggage being weighed using a portable luggage scale, the scale being in accordance with the second aspect, the item of luggage being attached to the scale with a looped hitch, using a look in the strap, rather through a knotted attachment.

A looped hitch, rather than a knot, avoids a possible accidental release of the luggage during a weighing, thereby avoiding a potential injury or accident.

Preferably the strap is a webbing strap having a width of at least 10 mm and most preferably 12 mm.

Preferably the strap has a length of more than 200 mm external of the housing and preferably a length of about 230 mm external of the housing, that length being the length of the loop where a loop is provided (i.e. a material length of more than 400 mm external of the housing, or 460 mm external of the housing, where the loop extends from the slot). Such a length provides an adequate length to allow the looping of the strap through a handle of an item of luggage, while then still being long enough to pass the housing through the remaining length of the loop for providing a looped hitch over the handle.

Preferably the strap has no knots or quick release mechanisms therein, either within the housing, or external of the housing—moulded connections, stitched connections or welded connections are preferred instead for any joints therein. This ensures a high strength for the strap. Such a strap further reduces the likelihood of an accidental release of a connected item of luggage.

The use of a strap, rather than a metallic or plastic member, such as a hook or a clip, also serves to avoid the presence of a cumbersome member at, or extending from, the bottom of the housing.

Preferably no quick release mechanism will be located external of the housing.

Preferably the weighing mechanism within the housing is a spring based weighing mechanism. It will be appreciated, however, that this second and third aspect of the present invention may instead be provided with a strain gauge form of weighing mechanism, whereupon the weight indicating screen may provide a digital readout of the measured weight.

Preferably the weight indicating screen is a window for allowing a viewing of a dial of the weighing mechanism.

For any of the above aspects of the present invention, it is preferred that the weight indicating screen, window or dial, faces, or is located at, a front of the housing for allowing a reading the weight of an item of luggage while lifting the item of luggage in front of the user.

According to a fourth aspect of the present invention, which may be combined with any of the above aspects, there is provided a portable luggage scale comprising a lifting handle, a luggage support, a housing, a weighing mechanism within the housing and a weight indicating screen or dial, wherein the luggage support, for attachment of the portable luggage scale to an item of luggage, extends from a bottom of the housing and wherein the lifting handle, in use, extends from a top of the housing, the handle being telescopically movable relative to the housing for sliding between an extended, in use position, in which the handle can be grasped by a user, and a retracted, travelling position, in which fingers cannot be passed around and through the handle.

With this arrangement, a cumbersome handle arrangement is no longer provided while the handle is in its retracted travelling position—the handle can be stowed, neatly, into its retracted travelling position, and then deployed, as necessary, into the in use position for weighing operations.

Preferably the handle travels at least 25 mm, and more preferably at least 35 mm, between its retracted travelling position and its extended in use position. That distance is sufficient to provide a wide enough opening between the inside of the handle and the top of the housing, when the handle is in its extended in use position, to allow the handle to be grasped by the fingers of the user.

Preferably the general shape of the hand grip portion of the handle generally matches the general shape of the portion of the housing located towards the top of the housing. For example, the profile of the inside of the handle can generally match the corresponding portion of the outside of the housing—such as within a groove. Also, preferably, the outside of the handle, at that hand grip portion of the handle, matches the upper profile of the housing—such as the lip of the groove. The upper portion of the housing can therefore align with, or lie parallel to, that top portion of the housing when the handle is retracted into its retracted travelling position.

These features each allow the handle more neatly to be stowed when not in use.

Preferably the handle grip portion is curved in an arcuate shape, with the top portion of the housing being similarly curved. Preferably for that purpose the housing comprises a generally round shape at at least the top portion of the housing.

Preferably the top portion of the housing comprises a groove or slot therein for receiving at least a portion of the lifting handle as it telescopically retracts relative to the housing into its retracted travelling position. Preferably that slot or groove is sufficiently deep to allow the hand grip portion of the handle to recess into the edge of the top portion of the housing to at least one third of the diameter of the handle, and preferably by at least a half of the diameter of the handle, or by at least 1 mm, or more preferably by at least 2 mm. It may even fully recess into the edge so as not to protrude when stored.

A finger cut-out can be provided to facilitate the grasping of the handle for pulling it from its retracted position into its extended position.

In addition to the aspects of the invention relating to the portable luggage scale, as defined above, the present invention also relates to methods of weighing an item of luggage, using one or more of the above aspects of the invention.

These and other features of the present invention will now be described in greater detail, with reference to the accompanying drawings in which.

Referring now to the drawings, and in particular FIGS. 1 to 8, a portable luggage scale 20 is shown. The luggage scale comprises a lifting handle 22, a luggage support 24 in the form of a strap 38 (see FIGS. 7 and 8), and a spring-based weighing mechanism 26 (see FIG. 12 for details thereof) contained within a housing 28.

Arranged for viewing at the front 32 of the housing is a weight indicating dial 30.

For providing a reference point for a weight indication when using the luggage scale, the front 32 of the housing 28 also features a measured weight indicating marker 36 in the form of a pointer. That pointer is a fixed marking on the front 32 of the housing 28, although it could have an alternative arrangement, such as a line extending across dial, or a movable marker or line, for allowing it to be moved for zeroing purposes.

The strap 38 extends out of a lower part or bottom 44 of the housing 28 through a slot 40. The slot 40 is clearly shown in FIG. 5. That slot 40 is an elongated slot having a wide enough opening (and a tall enough opening) to accommodate a double thickness of webbing—as preferred, the strap shown is a webbing strap 38 with the double thickness extending over the full length of the strap external of the housing, and forming a loop.

Figures 7, 8:
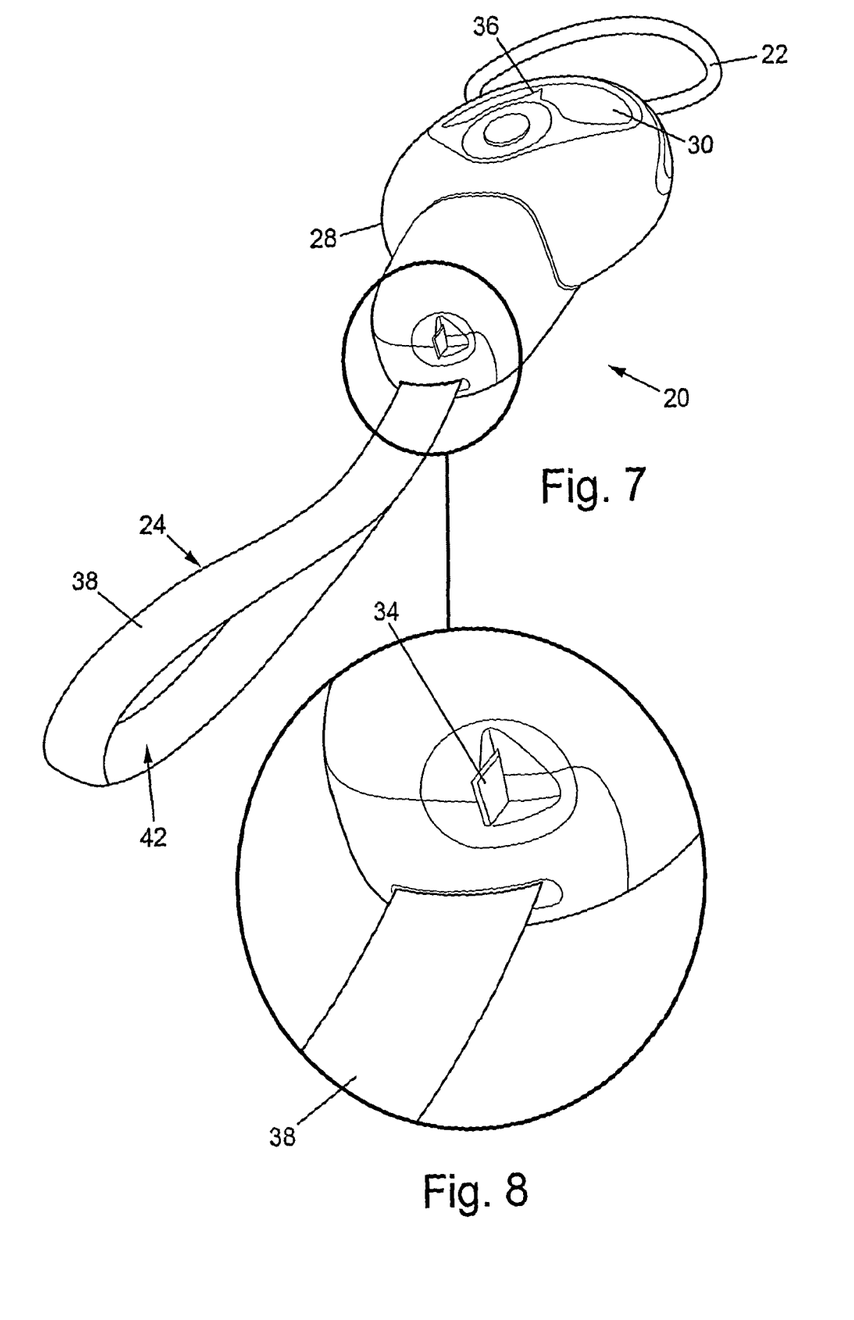
FIG. 7 shows the embodiment of FIG. 6 with a luggage support now included Thereon—attached to a weighing mechanism of the luggage scale, through the slot.
FIG. 8 shows a detail view of a portion of the luggage support extending through the slot and of a free end of a tape measuring system.
Figure 9:
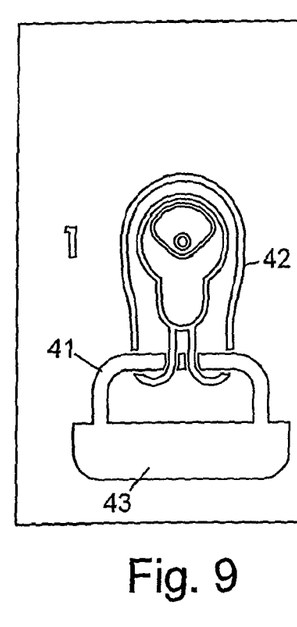
FIGS. 9 and 10 show a mode of attachment of the luggage support to an item of luggage.
Figure 10:
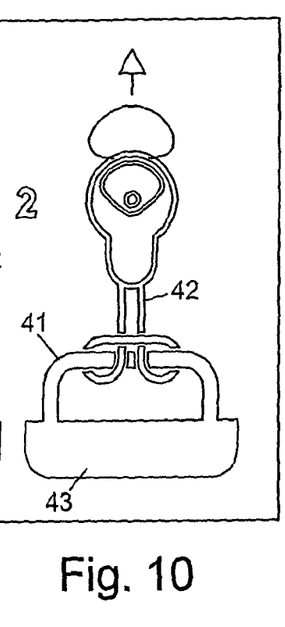

As a loop, as shown in FIG. 7, the strap 38 can be used for attaching that strap 38 to an item of luggage to be weighed by using a looped hitch over a handle 41 of that item of luggage 43, rather than necessarily needing a knot or a clip-type connection. See FIGS. 9 and 10.

Figure 11:
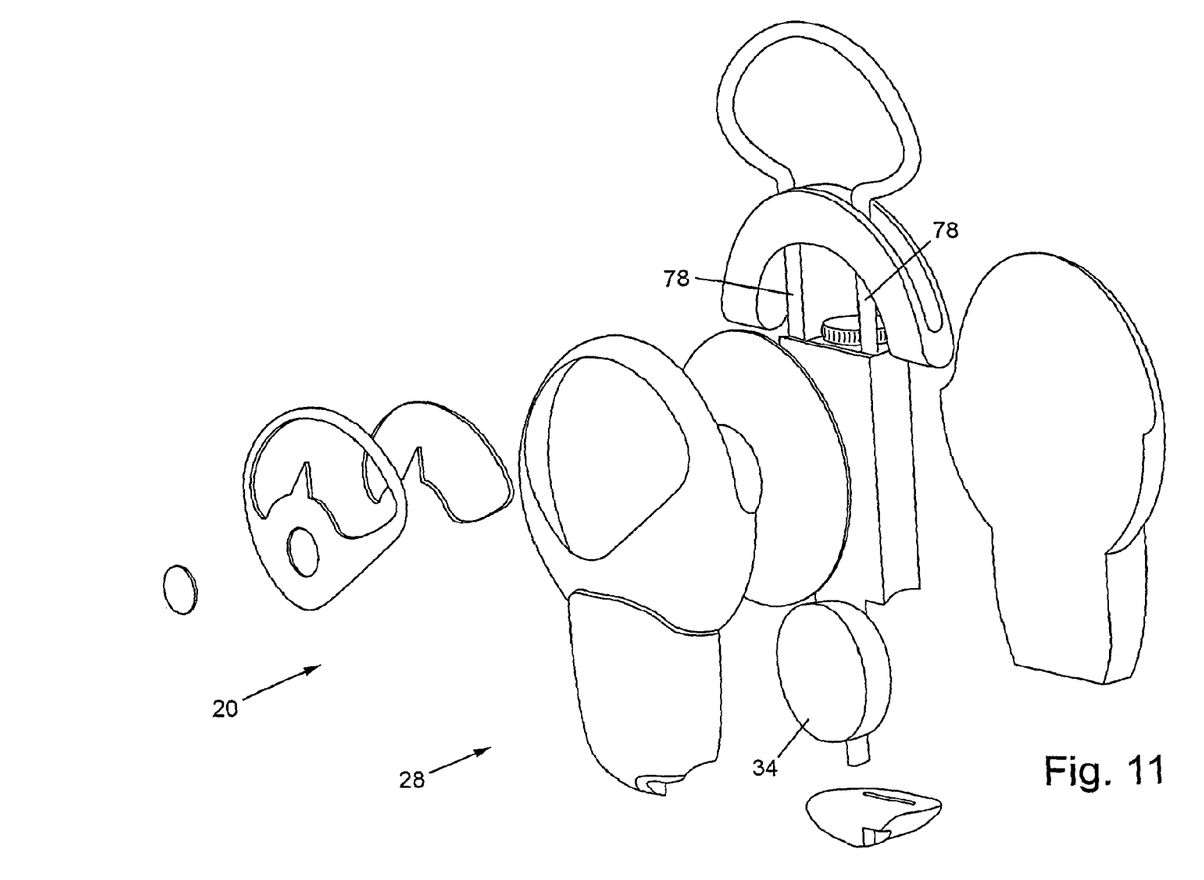
FIG. 11 is a schematic exploded view of various elements of a embodiment of portable luggage scale.

Also in that lower part, or bottom 44, of the housing 32 there is provided a tape measuring system 34. See, in particular, FIGS. 8, 11 and 12. It has a free end, retained from entering the housing at a recess 35, by a bent metal member. This allows the free end of the tape measuring system 34 to be accessible and easy to use, as per conventional tame measuring systems, and yet being such that there is a reduced likelihood of its free end fouling against the strap 38 during use of the strap (as compared to if it was to extend directly out of the side or end of the housing).

Figure 1:
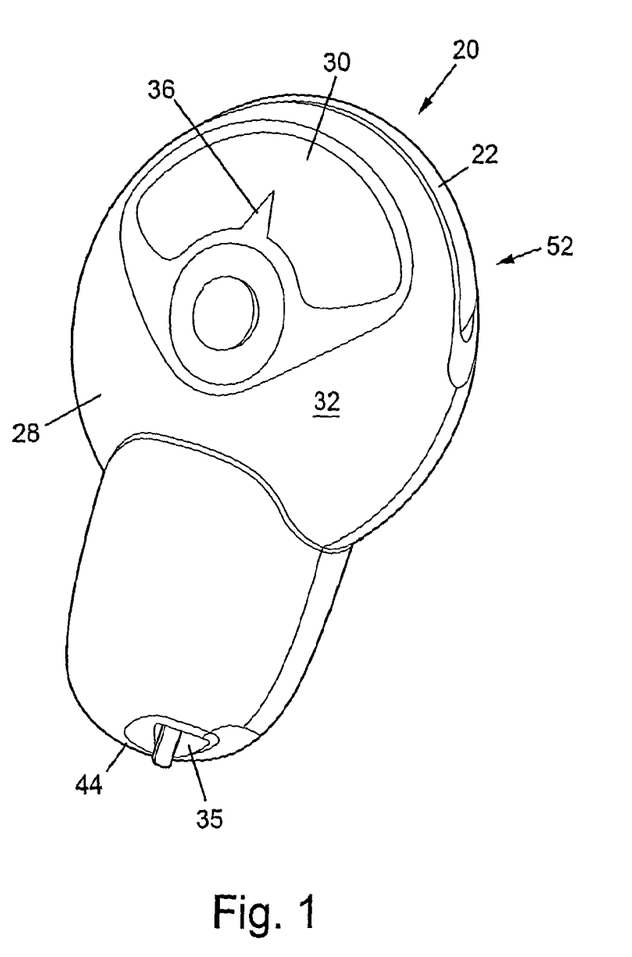
FIG. 1 shows a perspective view of an embodiment of portable luggage scale, albeit omitting therefrom a luggage support.
Figure 2:
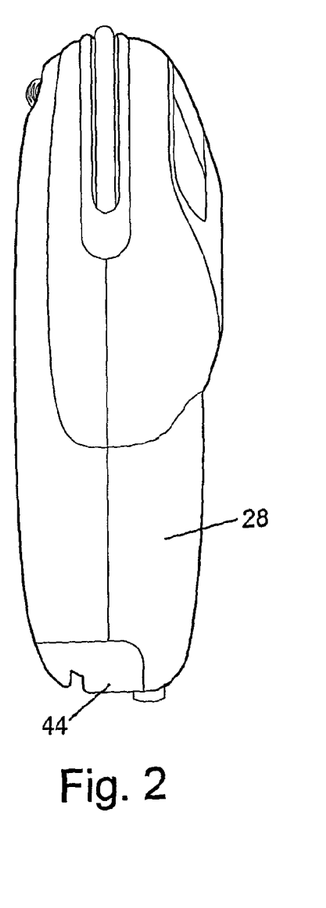
FIG. 2 shows a side elevation of the embodiment of FIG. 1.
Figure 3:
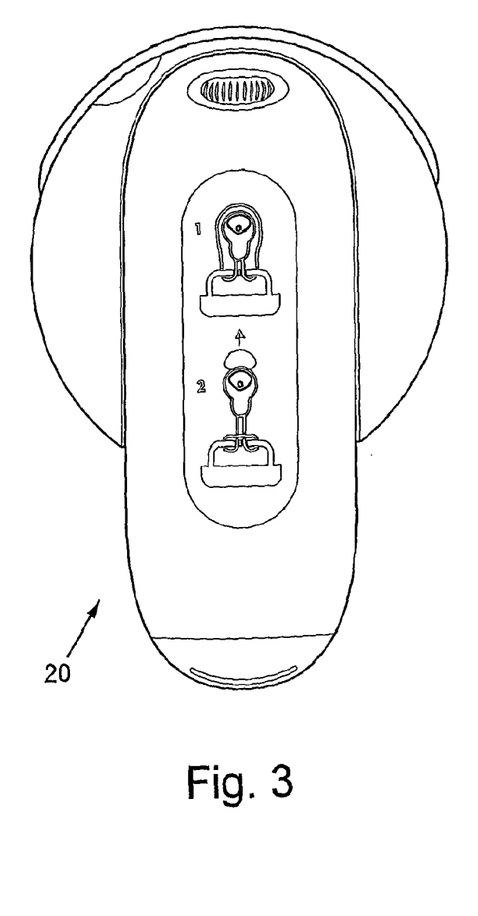
FIG. 3 shows a rear elevation of the embodiment of FIG. 1.
Figures 4, 5:
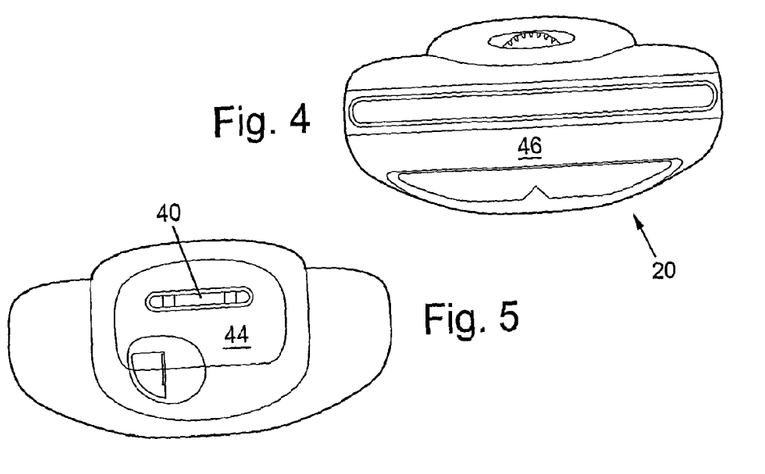
FIG. 4 shows a top plan view of the embodiment of FIG. 1.
FIG. 5 shows a bottom plan view of the embodiment of FIG. 1, with a slot in the bottom thereof visible therein.
Figure 6:
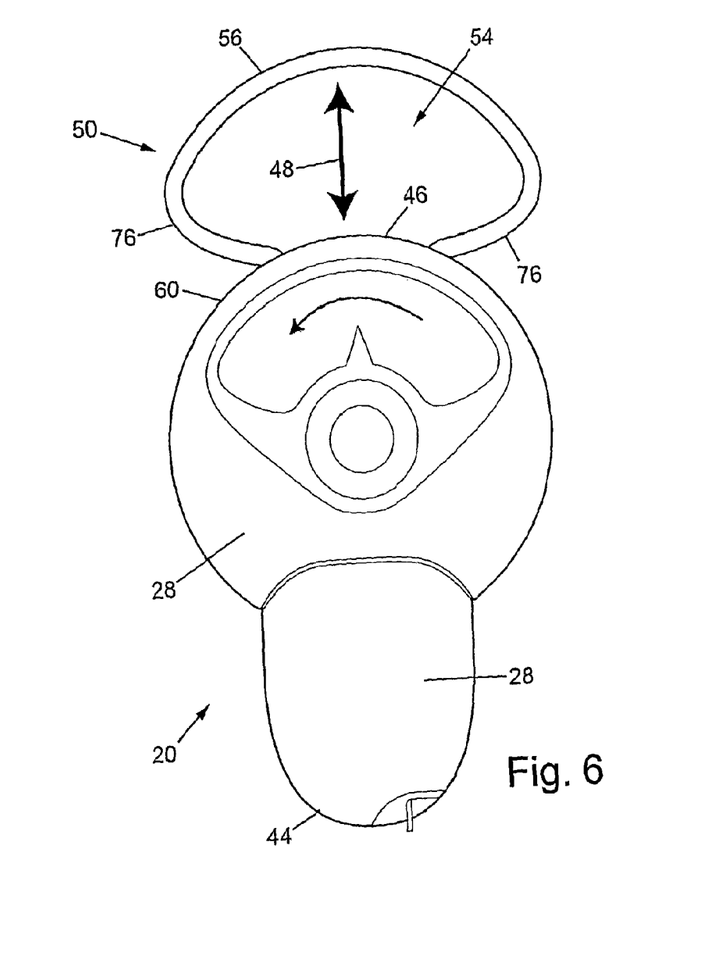
FIG. 6 shows a front elevation of the embodiment of FIG. 1 in which the lifting handle has been extended into an extended, in use position.

The lifting handle 22 is provided at the top 46 of the housing 28. That lifting handle 22 is telescopically movable 48 (see FIG. 6) between an extended, in use, position, as shown in FIG. 6, and a retracted, travelling, position, as shown in FIGS. 1 to 4. In the extended position 50 of FIG. 6, an inside 54 of the handle 22 is accessible to fingers to allow gripping of the handle 22 by a user. For facilitating that, the telescopic travel of the handle is preferably extended about 35 mm from a retracted, travelling position.

The telescopic nature of the handle is achieved using legs or runners that extend along grooves or slots in the housing. The legs or runners preferably comprise embossments or cut-outs, with corresponding cut-outs or embossments, respectively, in the grooves or slots, so as to provide a click engagement as the handle locates into either or both of its extended, in use position, or into its retracted, travelling position. This provides a positive, tactile indication to the user of the extended and/or retracted condition of the handle, thus providing confidence to the user.

As shown in FIG. 6, the handle, when in its extended position 50, has a curved hand grip portion 56, which grip portion at least has a generally round cross section—constant in this embodiment. Other cross sections are possible, such as wider grip portions for increased comfort. Likewise, different shapes for that hand grip portion are possible, e.g. for increasing grip stability. However, this round, simple, hand grip portion 56 is sufficient for the purpose, and it is easy to match the profile of the housing's top to it—as can be seen, the profile of the top 46 of the housing 28 is profiled to correspond with the shape and section of the hand grip portion. In that manner, when the handle 22 is retracted back into its travelling position 52, the curvature of the hand grip portion will match, or at least substantially correspond to, or be parallel to, the top portion 60 of the housing 28, thereby taking a neat and tidy stowage condition.

To further assist with this tidy stowage of the handle 22, in this embodiment the top portion 60 of the housing 28 is actually provided with a groove (see FIG. 2), having a generally semicircular cross section, whereby the sound sectioned handle 22 and in particular hand grip portion 56 can recess into that groove upon its retraction into its travelling position 52. A deeper groove would allow an additional recessing of the handle, but this part recessing is adequate for providing a neat and tidy stowage. It also allows the handle to be released more easily back into an extended position—a nail can slip under the handle. To facilitate that release further, however, a finger cut-out (not shown) can additionally be provided at the edge of the groove.

The handle 22, on either end of the hand grip portion 46, further features return shoulders 76. They bend generally inwardly relative to the hand grip portion 46. Those return shoulders 76 then bend to a parallel arrangement that continues with the two telescoping straight members 78 (see FIG. 11), which telescoping straight members are located to telescopically extend or slide in the grooves or slots in the structure of the housing 28.

Preferably that structure of the housing forms part of a framework for supporting the spring based weighing mechanism within the housing.

Figure 12:
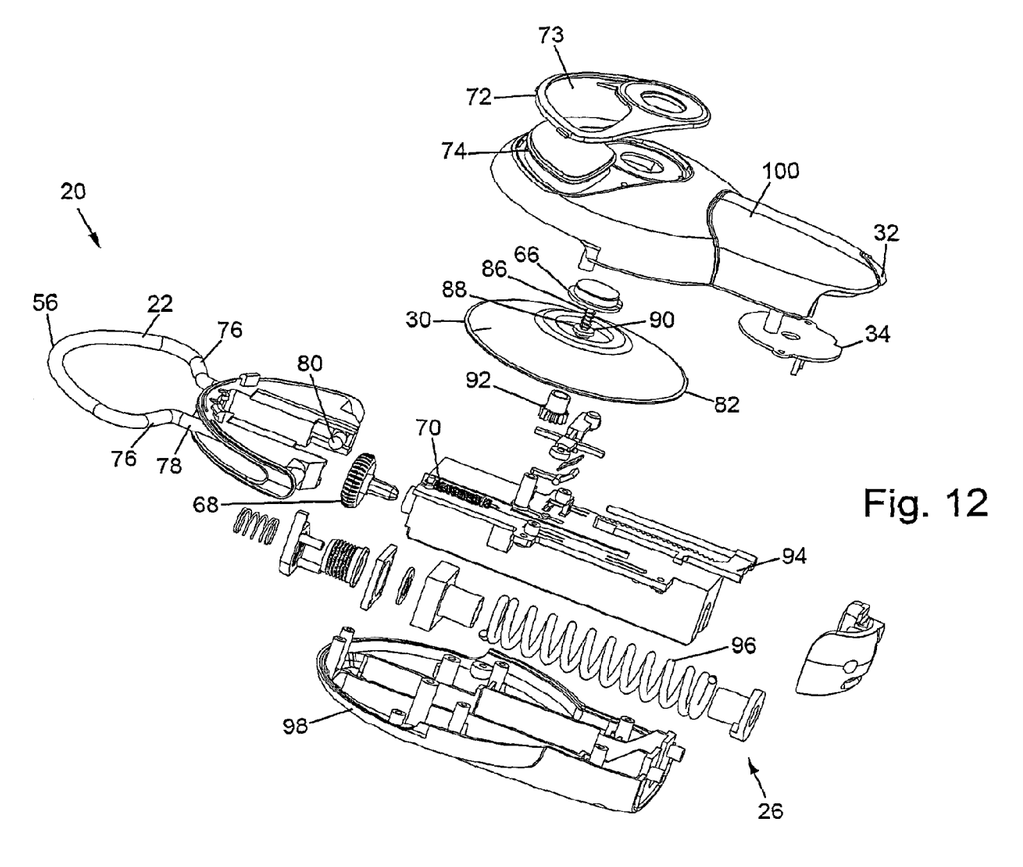
FIG. 12 shows an exploded view of a preferred embodiment of the present invention, albeit omitting therefrom a luggage support.

The very ends of the two telescoping straight members 78 have inwardly bent returns 80—one is shown in FIG. 12. They provide strong engagements between the handle and the housing, this preventing inadvertent overextension of the handle out of the housing 28—a failure of the handle.

Still referring to FIG. 12, the weight indicating dial 30 can be provided with a plurality of graduations thereon. Such graduations are well known in the art, and they can be in metric, or imperial, or both. They will be for indicating the measured weight, when combined with the marker 36. Those graduations are not shown in the drawings for clarity.

The weight indicating dial for this embodiment is a disk 82. The disk 82 has a central opening 84 through which a button 66 for actuating (or deactuating) dial retention mechanism 62 fits. That button 66 is a sprung button 66, with a spring 86 defaulting the button into an upward position. The spring fits over a pin member 88 having a flange 90 at its base. That flange 90 locates in and on top of a gear wheel 92 that will be driven by a rack gear 94 of the spring based weighing mechanism. Movement of the rack gear 94 thus drives the rotation of the gear wheel 92 and the movement of the dial follows that gear wheel when the dial retention mechanism is disengages from the dial, such as by pressing the button. Additionally, however a ratchet type arrangement is provided—part of, or associated with, the dial retention mechanism—for allowing a rotation of the gear wheel 92 to move the dial in one direction only, and to only a maximum degree of rotation corresponding to the maximum extent of displacement of the rack 94. This condition occurs when the button is not pressed. The ratchet type mechanism therefore holds the dial in a rotated condition—the current maximum rotated position, until the button is depressed.

As for the rack gear, it is adapted to move axially in response to movements of a carriage of the spring based weighing mechanism, which carriage is resisted form movement, or biased back to a start position, by the bias of a spring 96 of the spring based weighing mechanism.

Spring based weighing mechanisms, however, are generally known in the art, and thus a further description thereof is not needed here. The operation of the button for retaining and releasing extents of rotation of the dial, however, provides a distinction over those known spring based weighing mechanisms.

It is also to be observed that a zeroing wheel 68 is also provided for the spring based weighing mechanism so as to allow a zeroing of the portable luggage scales. That occurs upon turning the wheel. The wheel is adapted to turn a thread for driving an adjustment mechanism for fine tuning the zero of the dial. Again, since such zeroing mechanism are known in general in the art, a further disclosure of that mechanism also is not required. It should be noted, however, that while the button is not pressed, the dial will remain stationary, although upon depressing the button, the dial will reset to an adjusted zero position in response to any adjustments made to the wheel. Only upon depressing the button, however, can the extent of any zeroing adjustment be seen on the dial.

Still referring to FIG. 12, it can be seen that the housing 28 takes the form of a clamshell arrangement, with a rear clamshell member 98 and a front clamshell member 100. These two members can be provided to snap-fit together, or they can be joined together with screw threaded members.

Each clamshell member comprises a top half and a bottom half, with the top half being arranged to accommodate the weight indicating dial 30 and the bottom half being arranged to accommodate at least the tape measuring system 34. The spring based weighing mechanism may bridge across both halves.

Other arrangements are also possible for the housing, and the internal component thereof.

For accommodating the disk shaped weight indicating dial 30, the top half of each clamshell member is generally round or circular, although again other shapes can be provided, so long as the weight indicating dial can fit therein.

For the front clamshell member, a window is provided in the top half. That window is for viewing the relevant part of the weight indicating dial 30—the part indicating the measured weight. That window can be an open window, or as shown in FIG. 12, it can be glazed with a plastic or glass member 74, held in place in this example with a snap fitting cover member 72. That cover member 72 features an aperture 73 into which the glazing 74 will fit.

The glazing 74 is shown to have a generally arcuate shape. This allows a large arc of the weight indicating dial to be viewable through the window. Other shapes of window or aperture are also possible.

The snap fitting cover member 72 could also be replaced by having the glazing 74 fit from the inside of the front clamshell member, rather than being located on top of the clamshell member and sandwiched between that and the snap fitting cover member.

In this preferred embodiment, the dial retention mechanism 62, and in particular the button 66 thereof, passes through a further aperture that is provided in the snap fitting cover member 72 and also in the clamshell member 100. As a result, the button 66 is accessible from the front of the housing 28 for engaging and disengaging the dial retention mechanism.

The bottom half of the housing is shown to be generally elongated from an edge of the round top half. This shape readily accommodates a tape measuring system 34, although again other shapes are possible. With this illustrated shape, however, that bottom half can be seen to provide a comfortable handle or grip for holding the portable luggage scales during normal transport, or even potentially when weighing luggage, thus rendering the use of, and presence of, the telescopic lifting handle optional. After all, with the dial retention mechanism, the viewing of the dial at the time of lifting is non essential.

The present invention therefore provides a new form of portable luggage scale, having improved or simplified use characteristics.

The present invention has been described above purely by way of example. Modifications in detail may be made to the invention within the scope of the claims appended hereto.

The invention claimed is:

1. A portable luggage scale comprising a lifting handle, a luggage support, a weighing mechanism contained within a housing, and a weight indicating screen or dial for indicating weight measured with the weighing mechanism, wherein the luggage support takes the form of a strap forming a loop at its first end for allowing the strap to be attached to a handle of an item of luggage with a looped hitch, rather than needing a knot to be tied in the strap, and a second end extending away from the first end, and through a slot in the housing, the second end extending into the housing, through the slot, and being attached to the weighing mechanism within the housing, and wherein the lifting handle, in use, extends from a top of the housing, the handle being telescopically movable relative to the housing for sliding between an extended, in use position, in which the handle can he grasped by a user, and a retracted, travelling position, in which fingers cannot be passed around and through the handle;

wherein the weight indicating dial is associated with a dial retention mechanism for resisting movement of that weight indicating dial in a return-to-zero direction; and the portable luggage scale further comprises a retention release mechanism, operated by a press of a button.

2. A portable luggage scale comprising a lifting handle or grip, a luggage support, a housing, a spring based weighing mechanism within the housing, a weight indicating dial, the weight indicating dial being adapted for movement relative to the housing in response to spring reactions of the spring based weighing mechanism, and a measured weight indicating marker for indicating a measured weight, that weight being readable off the dial at the location of the market;

wherein the weight indicating dial is associated with a dial retention mechanism for resisting movement of that weight indicating dial in a return-to-zero direction; and wherein the portable luggage scale further comprises a retention release mechanism operated by a press of a button.

3. The scale of claim 2, wherein the weight indicating marker is in a fixed position relative to the housing, at least during movement of the weight indicating dial.

4. The scale of claim 2, wherein the weight indicating dial is mounted behind a window of the housing.

5. The scale of claim 4, wherein the window is a generally arcuate window, with top and bottom arcuate boundaries.

6. The scale of claim 2, wherein the weight indicating dial moves by rotating about a fixed axis relative to the housing.

7. The scale of claim 2, wherein the measured weight indicating marker is a pointer.

8. The scale of claim 2, wherein the weight indicating dial is a round dial, forming a complete circle or disk, with weight indications provided around at least a substantial extent of that circle or disk.

9. The scale of claim 2, wherein a tape measuring system is incorporated into the housing.

10. The scale of claim 2, further comprising a zeroing dial for allowing the dial to be zeroed.

11. A portable luggage scale comprising a lifting handle, a luggage support, a spring based weighing mechanism contained within a housing and a weight indicating dial for indicating weight measured with the weighing mechanism;

wherein the luggage support takes the form of a strap having a free first end for attachment to an item of luggage, and a second end extending away from the first end, and through a slot in the housing, the second end extending into the housing, through the slot, and being attached to the weighing mechanism within the housing, wherein the strap forms a loop at is first end for allowing the strap to be attached to a handle of an item of luggage with a looped hitch, rather than needing a knot to he tied in the strap;

wherein the weight indicating dial is associated with a dial retention mechanism for resisting movement of that weight indicating dial in a return-to-zero direction; and wherein the portable luggage scale further comprises a retention release mechanism, operated by a press of a button.

12. The scale of claim 11, wherein the strap is a webbing strap having a width of at least 10 mm.

13. The scale of claim 11, wherein the strap has a length of more than 200 mm external of the housing.

14. A portable luggage scale comprising a lifting handle, a luggage support, a housing, a spring based weighing mechanism within the housing and a weight indicating dial;

wherein the luggage support, for attachment of the portable luggage scale to an item of luggage, extends from a bottom of the housing;

wherein the lifting handle, in use, extends from a top of the housing, the handle being telescopically movable relative to the housing for sliding between an extended, in use position, in which the handle can be grasped by a user, and a retracted, travelling position, in which fingers cannot be passed around and through the handle;

wherein the top portion of the housing comprises a groove or slot therein for receiving at least a portion of the lifting handle as it telescopically retracts relative to the housing into its retracted travelling position;

wherein the weight indicating dial is associated with a dial retention mechanism for resisting movement of that weight indicating dial in a return-to-zero direction; and wherein the portable luggage scale further comprises a retention release mechanism, operated by a press of a button.

15. The scale of claim 14 wherein the handle travels at least 25 mm between its retracted traveling position and its extended in use position.

16. The scale of claim 14, wherein the outside of the handle generally matches the upper profile of the housing.

17. The scale of claim 14, wherein a finger cut-out is provided to facilitate the grasping of the handle for pulling it from its retracted position into its extended position.

18. The portable luggage scale of claim 1, the weighing mechanism being spring based, the weight indicating screen or dial being adapted for movement relative to the housing in response to spring reactions of the spring based weighing mechanism, and the scale further comprising a measured weight indicating marker for indicating a measured weight, that weight being readable off the dial at the location of the marker, wherein the weight indicating marker is in a fixed position relative to the housing, at least during movement of the weight indicating dial, and the weight indicating dial is mounted behind a window of the housing.

19. The portable luggage scale of claim 1, wherein:

the spring based weighing mechanism includes a rack gear;

the weight indicating dial is a disc with weight indications provided around at least a substantial extent of the disk and a central opening, the weight indicating dial moving by rotating about a fixed axis;

movement of the rack gear drives a rotation of a gear wheel and a movement of the weight indicating dial follows the gear wheel so that weight is readable off the weight indicating dial at a location of the measured weight indicating marker;

the button is fitted to extend through the central opening for actuating or deactuating the dial retention mechanism;

the button is a spring button, the dial retention mechanism being disengaged from the weight indicating dial by pressing the button; and a ratchet type arrangement is part of the dial retention mechanism for allowing a rotation of the gear wheel to move the weight indicating dial in one direction only, and to hold the weight indicating dial in a rotated position until the button is depressed.

20. The portable luggage scale of claim 2, wherein:

the spring based weighing mechanism includes a rack gear;

the weight indicating dial is a disc with weight indications provided around at least a substantial extent of the disk and a central opening, the weight indicating dial moving by rotating about a fixed axis;

movement of the rack gear drives a rotation of a gear wheel and a movement of the weight indicating dial follows the gear wheel so that weight is readable off the weight indicating dial at a location of the measured weight indicating marker;

the button is a spring button, the dial retention mechanism being disengaged from the weight indicating dial by pressing the button; and a ratchet type arrangement is part of the dial retention mechanism for allowing a rotation of the gear wheel to move the weight indicating dial in one direction only, and to hold the weight indicating dial in a rotated position until the button is depressed.

\* \* \* \* \*